United States Patent [19]

Kawakami

[11] Patent Number: 5,147,720
[45] Date of Patent: Sep. 15, 1992

[54] MAGNETIC RECORDING MEDIUM COMPRISING A MAGNETIC LAYER AND A BACKCOAT LAYER

[75] Inventor: Akira Kawakami, Hino, Japan

[73] Assignee: Konica Corporation, Tokyo, Japan

[21] Appl. No.: 580,214

[22] Filed: Sep. 10, 1990

[30] Foreign Application Priority Data

Sep. 14, 1989 [JP] Japan .................. 1-239175

[51] Int. Cl.$^5$ .......................................... G11B 5/00
[52] U.S. Cl. .................................. 428/336; 428/424.2;
428/425.9; 428/694; 428/900; 428/522
[58] Field of Search ............... 428/332, 336, 424.2,
428/425.9, 409, 694, 900, 522

[56] References Cited

U.S. PATENT DOCUMENTS 4,582,757  4/1986  Miyoshi et al. .................. 428/329
4,900,631  2/1990  Yamakawa ........................ 428/483

Primary Examiner—Paul J. Thibodeau
Assistant Examiner—Stevan A. Resan
Attorney, Agent, or Firm—Jordan B. Bierman

[57] ABSTRACT

A magnetic recording medium is disclosed which comprises a support and, provided thereon, a magnetic layer containing a binder and a back coat layer containing carbon black on the side opposite to the magnetic layer. The magnetic layer contains a copolymer comprising a unit derived from vinyl monomer having sulfonic acid salt group and a unit derived from vinyl carboxylic acid ester having a hydroxyl group, the back coat layer has Ra, an average surface roughness of from 0.010 to 0.035 μm, and not less than 70% by weight of the carbon black has an average particle diameter of from 10 to 30 μm.

18 Claims, 2 Drawing Sheets

MAGNETIC RECORDING MEDIUM COMPRISING A MAGNETIC LAYER AND A BACKCOAT LAYER

FIELD OF THE INVENTION

The present invention relates to a magnetic recording medium such as a magnetic tape, a magnetic sheet or a magnetic disk.

BACKGROUND OF THE INVENTION

Magnetic recording mediums such as magnetic tapes are commonly prepared by applying to a support a magnetic coating composition comprising a magnetic powder, a binder (or binder resin) and so forth, followed by drying.

In recent years, the magnetic recording mediums prepared in this way have made advance in their uses and commercialization in more and more fields, and accordingly have become required to have electromagnetic conversion characteristics, physical properties and other characteristics which are far superior to those of conventional ones. For this reason, various studied and improvements have been made also in respect of binders used in magnetic materials.

That is to say, as binders used for magnetic recording mediums, a cellulose derivative, a vinyl chloride/vinyl acetate copolymer, a polyurethane resin, an acrylic resin, copolymers of these, a vinylidene chloride resin and a copolymer thereof, an epoxy resin, a phenoxy resin, a polyester and so forth are used alone or in combination of several kinds of components. In particular, a typical example is a combination of a polyurethane resin with a vinyl chloride/vinyl acetate copolymer.

Even the combination of these components, however, can bring about no satisfactory results in respect of dispersibility of magnetic powder, and surface properties, wear resistance and durability that are required in a magnetic coating film. Hence, other required performances of a medium are often restricted. In addition, the S/N ratios become higher and magnetic powder is more densely packed in a medium along the recent tendency that magnetic powder is comprised of finer particles. This on the other hand brings about the deterioration of strength of a coating film and makes it impossible to sufficiently cope with troubles o defects such as dropout and edge break when a medium is formed into a tape.

SUMMARY OF THE INVENTION

An object of the present invention is to provide a magnetic recording medium that can improve the dispersibility of a magnetic powder and the surface properties of a magnetic coating film to enhance electromagnetic conversion characteristics, can improve wear resistance and durability of a magnetic coating film to decrease troubles such as dropout or edge break, and also can satisfy the required performance of a back coat layer at the same time so that the prevention of transfer to a magnetic coating film and the improvement in travel durability can be simultaneously achieved.

The present invention provides a magnetic recording medium comprising a support and, provided thereon, a magnetic layer containing a binder and a back coat layer containing carbon black on the side opposite to the magnetic layer, wherein said magnetic layer contains a copolymer comprising a unit derived from vinyl monomer having sulfonic acid salt group and a unit derived from vinyl carboxylic acid ester having a hydroxyl group, said back coat layer has Ra, an average surface roughness of from 0.010 to 0.035 μm, and not less than 70 by weight of the carbon black has an average particle diameter of from 10 to 30 μm.

DETAILED DESCRIPTION OF THE INVENTION

According to the present invention, the copolymer used as a binder of the magnetic layer has a repeating unit comprising a component containing a sulfonic acid salt group, so that the compatibility with magnetic powder can be improved through the moiety of this sulfonic acid salt group and hence the dispersibility of the magnetic powder in the binder can be improved. At the same time, the copolymer also has a component originating from a vinyl carboxylic acid ester containing a hydroxyl group, so that the dispersibility of the magnetic powder can be more improved because this ester component also has a good compatibility with the magnetic powder, and also the mechanical strength such as wear resistance and durability of the magnetic layer can be improved because the active hydrogen of the hydroxyl group reacts with an isocyanate (a cross-linking agent) to more increase the degree of cross-linking. Hence, even when fine particles with a poor dispersibility (in particular, those having a BET value of not less than 40 m$^2$/g) are used as a magnetic powder, the dispersibility can be improved and the surface properties of a magnetic layer can also be improved, so that the S/N ratios can be made higher and magnetic powder can be more densely packed in a medium. At the same time, a sufficient strength of the magnetic layer (magnetic coating film) can also be achieved and the troubles such as dropout or edge break can be decreased.

Moreover, the employment of the above binder enables simultaneous achievement of both the prevention of transfer to a magnetic layer and the improvement in travel durability, which are performances required for a back coat layer. In usual instances, if the surface of a back coat layer is rough, the surface form thereof tends to be transferred to the magnetic layer when, for example, a recording medium is wound up, and hence the surface of the back coat layer should be as smooth as possible. On the other hand, however, an excessively smooth surface may result in an increase in coefficient of friction to make poor the sliding against a guide or the like, so that tension such as tape tension becomes large to strengthen the touch of the magnetic layer against the head. This tends for the magnetic layer to be damaged. Thus, it follows that the surface of a back coat layer can not be made smooth so much, and this on the other hand makes it difficult to balance the above problem of transfer.

However, even when the surface of a magnetic layer is made relatively as smooth as not less than 0.010 μm and not more than 0.035 μm in an average surface roughness (Ra), the present invention makes it possible to fully prevent the damage of magnetic layer due to the increase in coefficient of friction of a smoothed back coat layer and the increase in tension, because of the improvement in strength of a magnetic layer which is attributable to the employment of the above binder. More specifically, even when the surface of a magnetic layer is made relatively as smooth as Ra=0.010 μm to 0.035 μm, the magnetic layer can fully endure even an increased friction against the head because the strength of the magnetic layer has been improved by the above binder. At the same time, since the surface of a magnetic layer is made relatively as smooth as Ra=0.010 μm to 0.035 μm, the above transfer to the magnetic layer can also be eliminated. (In addition, although the coefficient of friction increases when Ra is within this range, the travel performance of a medium can be assured). Thus, it is possible to simultaneously achieve both the performances, the improvement in travel durability (in particular, at the magnetic layer side) and the prevention of transfer to a magnetic layer.

In the present invention, the back coat layer is made to have an Ra of not more than 0.035. This enables improvement in surface properties. A value more than that, however, may bring about the above problem of transfer and also a brittle surface of the back coat layer, tending to cause scraping or edge break. An Ra value less than 0.010 μm may instead result in an excessive smoothness, and also may make it difficult to process such a smooth surface. This Ra may more preferably be in the range of from 0.012 to 0.032 μm, and still more preferably from 0.015 to 0.025 μm.

In the present invention, carbon black is contained in the back coat layer. This makes it possible to increase light-screening properties of a medium, to better prevent dust from being attracted by electrostatic charging, to lower coefficient of friction, and also to improve travel durability. Then, 70 wt. % or more of the black carbon is made to have an average particle diameter of from 10 to 30 μm. This is because the surface properties of the back coat layer can be set to be within the above range of Ra=0.10 to 0.035 μm, since the particle diameter of the carbon black is relatively small when the particle diameter is within the above range. The proportion of this carbon black should preferably be in the range of from 72 to 99% by weight, and more preferably from 75 to 90 by weight. The average particle diameter of this carbon black should preferably be in the range of from 12 to 27 μm, and more preferably from 15 to 25 μm. In the above carbon black, less than 30% by weight of carbon black has an average particle diameter more than 30 μm. Such a relatively large particle diameter enables control of the surface roughness of the back coat layer within the above range.

The magnetic recording medium of the present invention is as described above. It therefore can improve electromagnetic conversion characteristics under conditions of high temperature and high humidity, in particular, can greatly decrease reproducing demagnetization and also can improve slidability under conditions of low temperature and low humidity, in particular, can decrease sliding noise. It is also possible to decrease head wear under conditions of high temperature and high humidity, improve mechanical strength of a magnetic coating film, and also improve adhesion to a support. Moreover, it is possible to prepare a magnetic coating composition that can obtain a magnetic layer packed with magnetic powder in a high density without application of a high load in the course of manufacture, and have superior coating solution stability and coating properties.

In the present invention, the "average surface roughness (Ra)" of the back coat layer is a value measured using a three-dimensional surface roughness meter (3FK) manufactured by Kosaka Kenkyusho (cut-off: 0.25 mm). The "average particle diameter" of the black carbon contained in the magnetic layer is calculated from a histogram obtained by measuring diameters of 6,000 particles of carbon black primary particles when cross-sectional surfaces of particles are observed with an electron microscope having given magnifications.

The above binder used in the present invention is a copolymer having a repeating unit comprising a component containing a sulfonic acid salt group (herein called "Component I") and a component originating from a vinyl carboxylic acid ester containing a hydroxyl group (herein called "Component II"). Mixing proportion of these, when expressed in molar ratio based on the whole components of the binder, may preferably be from 0.1 to 50 mol %, and more preferably from 0.5 to 20 mol %, for Component I; and preferably be from 0.1 to 50 mol %, and more preferably from 0.5 to 20 mol %, for Component II. The ratio of Component I to Component II may preferably be from 0.1 to 10, and more preferably from 0.2 to 5.

This binder may preferably be a copolymer having a repeating unit represented by the following formula:

wherein Q+m+n=170 to 660, for example, 400 (in molecular weight, 10,000 to 50,000, for example, 17,000); Q:m:n=(60 to 98):(0.5 to 20):(0.5 to 20), for example, 90:4:6; q=2 to 8, for example, 2 or 3; and M represents an alkali metal such as sodium or potassium.

In place of the above vinyl chloride component, other vinyl component may be used. The vinyl chloride component may not be present.

Figure 1:
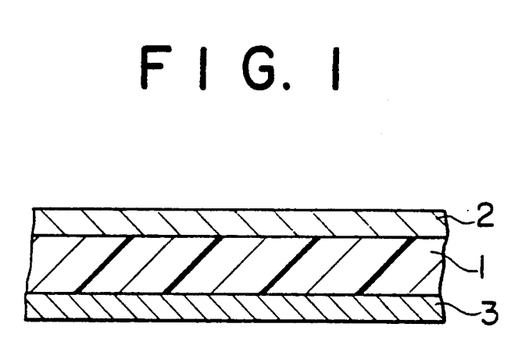
FIGS. 1 to 4 exemplarily illustrate the present invention, and are cross-sectional views of four examples of the magnetic recording mediums of the invention.
Figure 2:
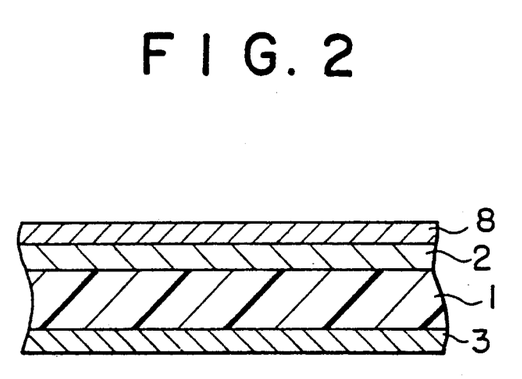

The magnetic recording medium of the present invention is constituted as shown, for example, in FIG. 1, according to which it comprises a support 1 made of polyethylene terephthalate or the like, and a magnetic layer 2 provided thereon. On the side opposite to this magnetic layer 2, a back coat layer 3 is provided. As shown in FIG. 2, an over coat layer 8 may also be provided on the magnetic layer 2 of the magnetic recording medium shown in FIG. 1.

The magnetic recording mediums as shown in FIGS. 1 and 2 may also be provided with a subbing layer (not shown) between the magnetic layer 2 and the support 1. Alternatively, the subbing layer may not be provided (the same applies hereinafter). The support may be subjected to corona discharge treatment.

The binder according to the present invention as described above (containing a repeating unit comprising Component I and Component II) is incorporated into the magnetic layer 2. A different type of binder may also be used in combination. The different type of binder that can be used in combination includes, for example, a vinyl chloride/vinyl acetate copolymer, a vinyl chloride/vinylidene chloride copolymer, a vinyl chloride/acrylonitrile copolymer, polyvinyl chloride, urethane resins, a butadiene/acrylonitrile copolymer, polyamide resins, polyvinyl butyral, cellulose derivatives such as cellulose acetate butyrate, cellulose diacetate, cellulose triacetate, cellulose propionate and nitrocellulose, a styrene/butadiene copolymer, polyester resins, all sorts of synthetic rubber, phenol resins, epoxy resins, urea resins, melamine resins, phenoxy resins, silicone resins, acrylic reactive resins, a mixture of a high-molecular polyester resin with an isocyanate prepolymer, a mixture of a polyester polyol with polyisocyanate, urea formaldehyde resins, a mixture of a low-molecular glycol/a high-molecular diol/isocyanate, and mixtures of some of these.

These binders should be resins containing a hydrophilic polar group such as $-SO_3M$, $-COOM$ or $-PO(OM')_2$ wherein M is hydrogen or an alkali metal such as lithium, potassium or sodium; and M' is an alkali metal such as lithium, potassium or sodium, or a hydrocarbon residual group. Such resins can improve compatibility with magnetic powder because of the polar group in the molecule, can thereby further improve the dispersibility of the magnetic powder, and also can prevent agglomeration of the magnetic powder to more improve coating solution stability, and besides can improve the durability of mediums.

The binder, in particular, the vinyl chloride copolymer, can be obtained by copolymerizing vinyl chloride monomers with copolymerizable monomers containing an alkali salt of sulfonic acid or phosphoric acid, and optionally other copolymerizable monomers. The resulting copolymer can be synthesized with ease since it is obtained by vinyl polymerization, and also copolymer components can be selected from various monomers, so that properties of a copolymer can be controlled in an optimum state.

The metal of the above salt of sulfonic acid or phosphoric acid is an alkali metal (in particular, sodium, potassium or lithium), and potassium is particularly preferred in view of its solubility, reactivity, yield, etc.

Magnetic powder may be contained in the magnetic layer 2. Such magnetic powder includes iron oxide magnetic powder such as $\gamma-Fe_2O_3$, Co-containing $-Fe_2O_3$, $Fe_3O_4$, or Co-containing $Fe_3O_4$; and ferromagnetic powder of various types such as Fe, Ni, Co, and metal magnetic powder mainly composed of Fe, Ni and Co, as exemplified by an Fe-Ni-Co alloy, an Fe-Ni alloy, an Fe-Al alloy, an Fe-Al-Ni alloy, an Fe-Al-Co alloy, an Fe-Mn-Zn alloy, an Fe-Ni-Zn alloy, an Fe-Al-Ni-Co alloy, an Fe-Al-Ni-Cr alloy, an Fe-Al-Co-Cr alloy, an Fe-Co-Ni-Cr alloy, an Fe-Co-Ni-P alloy or a Co-Ni alloy.

The magnetic layer has a thickness of from 1.8 to 4.6 μm, and preferably from 2.0 to 3.8 μm.

A lubricant as exemplified by silicone oil, graphite, molybdenum disulfide, tungsten disulfide, a monobasic fatty acid having 12 to 20 carbon atoms (e.g., stearic acid) or a fatty acid ester having 13 to 40 carbon atoms in total, an abrasive as exemplified by molten alumina, an antistatic agent as exemplified by carbon black or graphite, and a dispersing agent as exemplified by lecithin may also be added to the magnetic layer. The dispersing agent, however, may be unnecessary.

In the above, carbon black, is incorporated into the back coat layer 3 in accordance with the present invention. Light-screening carbon black as exemplified by Raven 2000 (specific surface area: 190 m²/g; average particle diameter: 18 mμ), 2100, 1170, 1000, available from Columbian Carbon Japan Limited, and #100, #75, #40, #35 or #30, available from Mistubishi Chemical Industries Limited, can be used as the carbon black. Conductive carbon black can also be used, which includes, for example, Conductex 975 (BET value (hereinafter simply "BET"): 250 m²/g; DBP oil absorption (hereinafter simply "DBP"): 170 ml/100 g; average particle diameter: 24 mμ), Conductex 900 (BET: 125 m²/g; average particle diameter: 27 μm), Conductex 40-220 (average particle diameter: 20 mμ), Conductex SC (BET: 220 m²/g; DBP: 115 ml/100 g; average particle diameter: 20 mμ), available from Columbian Carbon Japan Limited., Vulcan XC-72 (specific surface area: 254 m²/g; average particle diameter: 30 mμ), Vulcan P (BET: 143 m²/g; DBP: 118 ml/100 g; average particle diameter: 20 mμ), available from Cabot Corp.; Raven 1040, 420; Black Pearls 2000 (average particle diameter: 15 mμ): and #44, available from Mistubishi Chemical Industries Limited.

Other carbon black that can be used in the present invention includes Conductex-SC (BET: 220 m²/g; DBP: 115 ml/100 g; average particle diameter: 20 mμ), available from Columbian Carbon Japan Limited; Vulcan 9 (BET: 140 m²/g; DBP: 114 ml/100 g; average particle diameter: 19 mμ), available from Cabot Corp.; #80 (BET 117 m²/g; DBP: 113 ml/100 g; average particle diameter: 23 mμ), available from Asahi Carbon Co., Ltd.; HS100 (BET 32 m²/g; DBP: 180 ml/100 g; average particle diameter: 53 mμ), available from Denki Kagaku Kogyo Kabushiki Kaisha; and #22B (BET 55 m²/g; DBP: 131 ml/100 g; average particle diameter: 40 mμ), #20B (BET 56 m²/g; DBP: 115 ml/100 g; average particle diameter: 40 mμ). #3500 (BET 47 m²/g; DBP: 187 ml/100 g; average particle diameter: 40 mμ), available from Mistubishi Chemical Industries Limited. It also includes CF-9, #4000, MA-600, available from Mistubishi Chemical Industries Limited., Black pearls L, Monarck 800, Black Pearls 700, Black Pearls 1000, Black Pearls 880, Black Pearls 900, Black Pearls 1300, Black Pearls 2000, Sterling V, available from Cabot Corp; Raven 410, Raven 3200, Raven 430, Raven 450, Raven 825, Raven 1255, Raven 1000, Raven 5000, Ketien Black FC, available from Columbian Carbon Japan Limited.

The above binder and carbon black are contained in the back coat layer 3 optionally together with non-magnetic particles such as barium sulfate, which are provided on the back of the support. The surface of the back coat layer 3 is made to have an average surface roughness (Ra) of from 0.010 to 0.035 μm, and 70 wt. % or more of the carbon black is made to have an average particle diameter of from 10 to 30 μm.

The back coat layer has a thickness of from 0.4 to 1.2 μm, and preferably from 0.6 to 1.0 μm.

As materials for the above support 1, used are plastics such as polyethylene terephthalate and polypropylene, metals such as Al and Zn, ceramics such as glass, BN (boron nitride), silicon carbide, porcelain and earthenware.

Figure 3:
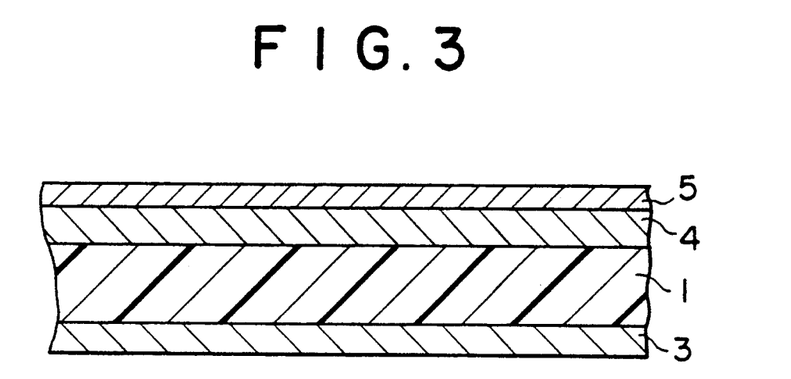

The magnetic recording medium of the present invention may alternatively comprise, as shown in FIG. 3, a support 1 and provided thereon, a first magnetic layer 4 and a second magnetic layer 5 in this order. In the example shown in FIG. 4, the upper layer is further divided into layers 6 and 7.

Figure 4:
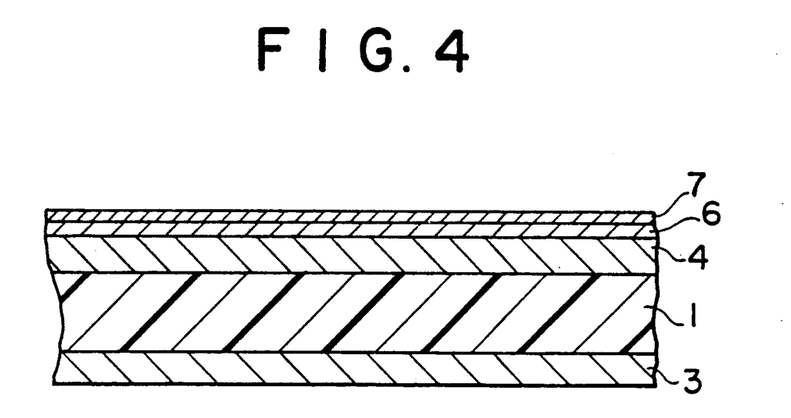

In the magnetic recording mediums shown in FIGS. 3 and 4, the first magnetic layer 4 may preferably have a coating thickness of from 1.5 to 4.0 μm, and the second magnetic layer 5 or the third magnetic layers 6 and 7 in total, may preferably have a coating thickness of not more than 0.6 μm (for example. 0.5 mμ).

In the instance where the magnetic layer is comprised of plural layers as shown in FIGS. 3 and 4, the layer in which the binder according to the present invention is contained may be the uppermost layer 5 or 7, and, in addition thereto, the lower layer 4 or 6. Alternatively, the binder may be contained in any one or at least one of plural layers. These plural layers may be compositionally the same as the above magnetic layer 2. Other than the case when a clear boundary is substantially present between the layers, a boundary region at which the magnetic powders of both layers are mixed can often be present in a given thickness. The above upper layer or lower layer refers to the upper or lower layer from which such a boundary region is excluded.

When the constitution as described above is taken, each layer can be formed in the manner that the upper layer of plural layers that constitute magnetic layers may have good recording and reproducing characteristics at higher frequencies such as video outputs and also the lower layer may have good recording reproducing characteristics at relatively lower frequencies such as chroma or audio outputs. For this purpose, the upper layer (in particular, the uppermost layer) must commonly have a larger coercive force (Hc) than the lower layer, and also the upper layer must have a smaller coating thickness (or layer thickness), which particularly should be not more than 0.6 μm.

EXAMPLES

The present invention will be described below by giving Examples.

The components, proportions, and order of operations are variable so far as they may not be out of the scope of the concept of the present invention. In the following examples, "part(s)" refers to part(s) by weight in every instance.

EXAMPLE 1

First, a composition with the components as shown below was thoroughly kneaded and dispersed using a kneader and a sand mill.

| | |
|---|---|
| Co-γ-Fe$_2$O$_3$ (Coercive force Hc: 750 Oe) | 100 parts |
| Vinyl chloride copolymer (Exemplary Compound 1) | 10 parts | l + m + n = approximately 400, l:m:n = 90:4:6

| | |
|---|---|
| Polyurethane resin | 7 parts | molecular weight: 56,000)

| | |
|---|---|
| α-Al$_2$O$_3$ (average particle diameter: 0.2 μm) | 10 parts |
| Stearic acid | 1 part |
| Butyl stearate | 0.5 part |
| Methyl ethyl ketone | 100 parts |
| Cyclohexanone | 120 parts |
| Toluene | 80 parts |

After the composition was thoroughly kneaded and dispersed, 3 parts of a polyfunctional isocyanate (Mitec AD, available from Mitsubishi Chemical Industries Limited) was further added and thoroughly blended to prepare a magnetic coating composition.

The resulting magnetic coating composition was applied to a 13 μm thick polyethylene terephthalate base under accurate control so as to give a dry coating thickness of 3.0 μm, followed by orientation and drying in a magnetic field, and thereafter super calendering. Thereafter, to the opposite surface of the base on which the magnetic layer was thus formed, a back coat layer coating composition having the following composition was applied so as to give a dry coating thickness of 0.7 μm. A magnetic recording medium having a back coat layer was thus obtained.

| | |
|---|---|
| Carbon black (average particle diameter: 20 mμ) | 40 parts |
| Carbon black (average particle diameter: 300 mμ) | 5 parts |
| Nitrocellulose (Cellunova BTH ½, available from Asahi Chemical Co., Ltd.) | 25 parts |
| N-2301 (available from Nippon Polyurethane Industry Co., Ltd.) | 25 parts |
| Colonate L (available from Nippon Polyurethane Industry Co., Ltd.) | 10 parts |
| Cyclohexanone | 400 parts |
| Methyl ethyl ketone | 250 parts |
| Toluene | 250 parts |

The resulting magnetic recording medium was cut in a width of ½ inches at a line speed of from 700 m/min to 750 m/min. A video tape was thus prepared. This was designated as Sample No. 1.

EXAMPLES 2 to 9, COMPARATIVE EXAMPLES 1 to 10

Next, the exemplary compound 1 in the above was replaced with the compound as shown in Table 1 to give samples Nos. 2 to 19.

On each sample, squareness ratio, reproduction output, etc. were measured in the following manner.

(a) Squareness Ratio

Using a sample vibration type magnetic flux meter (VSM) manufactured by Toei Kogyo K. K., the value Br/Bm at the maximum magnetic field of 10 KOe was measured.

(b) Reproduction Output

With regard to reproduction output, RF output of 100% white signals was measured using HR-S6000, manufactured by Victor Co., of Japan, as a measuring deck.

(c) Travel Durability

Travel durability under conditions of 20° C., 60% RH was also measured. This travel durability was measured by checking whether or not practical troubles occurred in the course of initial two-hour recording and subsequent 1,000 time repetitions for rewind and reproducing, using a 120 minute tape cassette in HR-S6000 (manufactured by Victor Co., of Japan). "OK" indicates a good result, and "NG", a no good result.

(d) Average Surface Roughness (Ra)

The Ra of a back coat layer was measured using a three dimensional surface roughness meter (3FK) manufactured by Kosaka Kenkyusho (cut-off: 0.25 mm).

(e) Reproducing Demagnetization

A lowering of RF output of each sample having been travelled forward and back 20 times under conditions of 40° C., 80% RH in HR-S6000 (manufactured by Victor Co., of Japan) was measured as reproducing demagnetization.

(f) Sliding Noise (i) Reproducing is carried out without travel of a tape, and system noise is measured using a spectrum analyzer. (ii) On a sample tape, reproducing is carried out 10 times for one minute each, and sliding noise is measured using a spectrum analyzer. (iii) In respect of a noise level around 8 MHz, noise values for 10 passes are read as an average value, on the basis of a system noise (0 dB). Measurement was made under conditions of low temperature and low humidity, of 10° C., 20% RH.

(g) Head Wear

Head wear was also observed at the same time when the above reproducing demagnetization was measured.

(h) Dropout

Using a dropout counter VD-5M, manufactured by Victor Co., of Japan, an output which was longer than 15 μsec and lowered 20 dB or more of the output of an RF envelope was counted as one dropout. Dropouts were measured over the whole length, and an average value per minute was determined.

(i) Adhesion Properties

In the above travel durability test, the state of adhesion between the magnetic layer and the support (base) was observed. "A" indicates a good result, "B", a somewhat poor result, and "C", a poor result.

(j) Transfer

The surface of each magnetic layer was observed with a microscope of 200 magnifications to determine an average number of the marks of transfer which were 0.3 mm or more in diameter and remained per 1 cm².

Results obtained on each sample are shown in Table 2.

TABLE 1

| Exemplary Compound | Structure | Average degree of polymerization |
|---|---|---|
| 2 | $-(CH_2-CHCl)_l-(CH_2-CHSO_3Na)_m-(CH_2-CH(C(=O)O-CH_2CH_2OH))_n-$ | 350, $l:m:n = 94:5:1$ |
| 3 | $-(CH_2-CHCl)_l-(CH_2-CHSO_3Na)_m-(CH_2-CH(C(=O)O-CH_2-CH(-O-CH_2-)))_n-(CH_2-CH(C(=O)O-CH_2-CH(OH)-CH_3))_p-$ | 290, $l:m:n:p = 89:4:4:3$ |
| 4 | $-(CH_2-CHCl)_l-(CH_2-CHSO_3Na)_m-(CH_2-CH(C(=O)OCH_2CH_2CH_2CH_2OH))_n-$ | 480, $l:m:n = 75:10:15$ |
| 5 | $-(CH_2-CHCl)_l-(CH_2-CH(CH_2SO_3Na))_m-(CH_2-CH(C(=O)O-CH_2CH_2CH(-O-CH_2-)))_n-(CH_2-C(CH_3)(C(=O)O-CH_2CH_2CH_2OH))_p-$ | 400, $l:m:n:p = 84:5:6:5$ |
| 6 | $-(CH_2-CHCl)_l-(CH_2-CH(CH_2SO_3Na))_m-(CH_2-CH(C(=O)OCH_2CH_2OH))_n-$ | 320, $l:m:n = 88:6:6$ |

TABLE 1-continued

| Exemplary Compound | Structure | Average degree of polymerization |
|---|---|---|
| 7 | $-(CH_2-CHCl)_l-(CH_2-CH(SO_3Na))_m-(CH_2-CH(C(=O)OCH_2CH_2CH(OH)CH_3))_n-$ | 390<br>$l:m:n = 77:8:15$ |
| 8 | $-(CH_2-CHCl)_l-(CH_2-CH(SO_3Na))_m-(CH_2-CH(C(=O)CH_2CH(CH_2)O))_n-(CH_2-CH(C(=O)OCH_2CH_2CH_2OH))_p-$ (with glycidyl epoxide side group) | 260<br>$l:m:n:p = 65:18:12:5$ |
| 9 | $-(CH_2-CH_2)_l-(CH_2-CH(SO_3Na))_m-(CH_2-CH(C(=O)OCH_2CH_2OH))_n-$ | 480<br>$l:m:n = 80:15:5$ |
| 10 | $-(CH_2-CHCl)_l-$ | 180 |
| 11 | $-(CH_2-CHCl)_l-(CH_2-CH(CH_2SO_3Na))_m-$ | 260<br>$l:m = 90:10$ |
| 12 | $-(CH_2-CHCl)_l-(CH_2-CH(COOH))_m-$ | 500<br>$l:m = 95:5$ |
| 13 | $-(CH_2-CHCl)_l-(CH(COOH)-CH(COOH))_m-$ | 450<br>$l:m = 98:2$ |
| 14 | $-(CH_2-CHCl)_l-(CH_2-CH(COOH))_m-$ | 450<br>$l:m = 97:3$ |
| 15 | $-(CH_2-CHCl)_l-(CH_2-CH(CH_2SO_3Na))_m-(CH_2-CH(OH))_n-$ | 400<br>$l:m:n = 90:5:5$ |
| 16 | $-(CH_2-CHCl)_l-(CH_2-CH(SO_3Na))_m-(CH_2-CH(C(=O)OCH_2CH_3))_n-$ | 290<br>$l:m:n = 95:2:3$ |
| 17 | $-(CH_2-CHCl)_l-(CH_2-CH(SO_3Na))_m-(CH_2-CH(COOH))_n-$ | 380<br>$l:m:n = 92:4:4$ |

TABLE 1-continued

| Exemplary Compound | Structure | Average degree of polymerization |
|---|---|---|
| 18 | -(-CH$_2$-CHCl-)$_l$-(-CH$_2$-CH(C=O-OCH$_2$CH$_2$OH)-)$_m$- | 370<br>l:m = 80:20 |
| 19 | -(-CH$_2$-CHCl-)$_l$-(-CH$_2$-CH(SO$_3$H)-)$_m$-(-CH$_2$-CH(C=O-OCH$_2$CH$_2$OH)-)$_n$- | 460<br>l:m:n = 95:1:4 |

TABLE 2

| | Compound No. | Squareness ratio | RF output (dB) | Travel durability | Ra of back coat layer ($\mu$m) | Reproducing demagnetization (dB) | Sliding noise (dB) | Head wear ($\mu$m) | Dropout (no.) | Adhesion | Transfer |
|---|---|---|---|---|---|---|---|---|---|---|---|
| Example: | | | | | | | | | | | |
| 1 | 1 | 0.94 | +1.5 | OK | 0.018 | −0.2 | +1.6 | 2 | 2 | A | 0 |
| 2 | 2 | 0.93 | +1.3 | OK | 0.022 | −0.4 | +1.7 | 1 | 1 | A | 1 |
| 3 | 3 | 0.94 | +2.0 | OK | 0.020 | −0.3 | +0.9 | 1 | 3 | A | 0 |
| 4 | 4 | 0.93 | +1.3 | OK | 0.015 | −0.2 | +1.8 | 0 | 0.8 | A | 0 |
| 5 | 5 | 0.94 | +2.0 | OK | 0.025 | −0.3 | +2.0 | 0 | 2 | A | 1 |
| 6 | 6 | 0.92 | +1.5 | OK | 0.020 | −0.3 | +1.5 | 1 | 1 | A | 0 |
| 7 | 7 | 0.93 | +1.0 | OK | 0.016 | −0.4 | +0.7 | 2 | 4 | A | 0 |
| 8 | 8 | 0.94 | +1.9 | OK | 0.018 | −0.1 | +1.1 | 3 | 1 | A | 0 |
| 9 | 9 | 0.95 | +2.2 | OK | 0.016 | −0.3 | +1.0 | 1 | 0.7 | A | 1 |
| Comparative Examples: | | | | | | | | | | | |
| 1 | 10 | 0.88 | 0 | NG, 350* | 0.019 | −2.5 | +1.7 | 8 | 15 | B | 0 |
| 2 | 11 | 0.87 | +0.2 | NG, 500** | 0.020 | −2.2 | +2.5 | 6 | 38 | C | 2 |
| 3 | 12 | 0.85 | −0.5 | OK | 0.016 | −1.8 | +4.2 | 5 | 12 | A | 0 |
| 4 | 13 | 0.85 | +0.2 | NG, 250*** | 0.020 | −2.0 | +1.5 | 7 | 3 | A | 0 |
| 5 | 14 | 0.87 | 0 | NG, 400*** | 0.022 | −1.5 | +3.2 | 4 | 6 | A | 0 |
| 6 | 15 | 0.90 | +0.7 | NG, 150* | 0.018 | −1.0 | +3.0 | 5 | 2 | A | 0 |
| 7 | 16 | 0.90 | +0.7 | OK | 0.020 | −2.2 | +1.9 | 4 | 10 | C | 0 |
| 8 | 17 | 0.89 | +0.5 | NG, 800**** | 0.017 | −2.7 | +2.4 | 8 | 5 | A | 0 |
| 9 | 18 | 0.85 | −0.3 | OK | 0.020 | −0.8 | +4.0 | 5 | 12 | B | 1 |
| 10 | 19 | 0.93 | +1.0 | OK | 0.018 | −2.0 | +1.5 | 4 | 8 | A | 0 |

*Number of times at which edge break occurred.
**Number of times at which dusting greatly occurred.
***Number of times at which travel stopped.
****Number of times at which RF was greatly lowered.

As is evident from the results shown in Table 2, the respective characteristics are all improved as in Examples 1 to 9 when the binder according to the present invention is used in the magnetic layer.

COMPARATIVE EXAMPLES 11 to 18

Next, the back coat layer coating composition as used in Examples 1 to 8 was changed to have the formulation as shown below, and a back coat layer was provided on the opposite side of each magnetic layer in the same manner as in Examples 1 to 8. Thereafter, the resulting magnetic recording mediums were slit to prepare video tapes of ½ inches in width. Measurement was made on each of these tapes to obtain the results as shown in Table 3.

| | |
|---|---|
| Carbon black (average particle diameter: 300 m$\mu$) | 45 parts |
| Nitrocellulose (Cellunova BTH ½, available from Asahi Chemical Co., Ltd. | 25 parts |
| N-2301 (available from Nippon Polyurethane Industry Co., Ltd.) | 25 parts |
| Colonate L (available from Nippon Polyurethane Industry Co., Ltd.) | 10 parts |
| Cyclohexanone | 400 parts |
| Methyl ethyl ketone | 250 parts |
| Toluene | 250 parts |

TABLE 3

| Comparative Example | Compound No. | RF output (dB) | Travel durability | Ra of coat layer ($\mu$m) | Transfer |
|---|---|---|---|---|---|
| 11 | 1 | +1.0 | NG, 70 passes* | 0.070 | 14 |
| 12 | 2 | +0.7 | OK | 0.085 | 20 |
| 13 | 3 | +1.0 | NG, 200 passes** | 0.069 | 15 |
| 14 | 4 | +0.2 | NG, 150 passes*** | 0.055 | 8 |
| 15 | 5 | +0.8 | NG, 110 passes* | 0.091 | 35 |
| 16 | 6 | +0.5 | NG, 50 passes*** | 0.044 | 7 |
| 17 | 7 | +0.4 | NG, 73 passes* | 0.065 | 11 |
| 18 | 8 | +1.0 | NG, 42 passes*** | 0.072 | 20 |

*at which serious scraping of the back coat layer occurred.
**at which edge break occurred.
***at which travel stopped.

Thus, when the Ra of the back coat layer is more than 0.035 $\mu$m and is outside the scope of the present invention, the RF output increases, and moreover the transfer to the magnetic layer at the time of wind-up of tapes increases. The travel durability (of the back coat layer) also become poor.

EXAMPLES 10, 11, COMPARATIVE EXAMPLES 19, 20

In Example 1, the proportion of carbon black with an average particle diameter of 20 mμ and carbon black with an average particle diameter of 300 mμ in the back coat layer was varied. As a result, tape performances as shown in Table 4 were obtained

TABLE 4

| | Ra of back coat layer (μm) | Amount of carbon black (part(s)) | | RF output (dB) | Travel durability | Trans- fer |
|---|---|---|---|---|---|---|
| | | 20 mμ | 300 mμ | | | |
| Example: | | | | | | |
| 1 | 0.018 | 40 | 5 | +1.5 | OK | 0 |
| 10 | 0.010 | 43 | 2 | +1.7 | OK | 0 |
| 11 | 0.035 | 32 | 13 | +1.6 | OK | 1 |
| Comparative Example: | | | | | | |
| 19 | 0.005 | 45 | 0 | +1.8 | NG, 12 passes* | 0 |
| 20 | 0.040 | 25 | 20 | +0.8 | NG, 38 passes** | 6 |
| 11 | 0.070 | 0 | 45 | +1.0 | NG, 70 passes** | 14 |

*at which sticking and edge break occurred.
**at which serious scraping of the back coat layer occurred.

As will be evident from the results shown in Table 4, good performances can be attained when the Ra of the back coat layer is in the range of from 0.010, i.e., $$\left( \frac{\text{Carbon black of 20 } m\mu}{\text{Carbon black of 20 } m\mu} < 70\% \text{ by weight} \right).$$

EXAMPLES 12 to 15, COMPARATIVE EXAMPLES 21 to 23

In Example 1, the average particle diameter of the carbon black with a smaller average particle diameter (20 mμ) in the two types of carbon black was varied to obtain the results as shown in Table 5, which are in relation to the Ra.

TABLE 5

| | Average particle diameter of carbon black (mμ) | Ra of back coat layer (μm) |
|---|---|---|
| Example: | | |
| 1 | 20 | 0.018 |
| 12 | 10 | 0.010 |
| 13 | 15 | 0.016 |
| 14 | 25 | 0.027 |
| 15 | 30 | 0.035 |
| Comparative Example: | | |
| 21 | 5 | 0.004 |
| 22 | 35 | 0.040 |

TABLE 5-continued

| | Average particle diameter of carbon black (mμ) | Ra of back coat layer (μm) |
|---|---|---|
| 23 | 40 | 0.051 |

Thus, it is seen that the carbon black having a smaller particle diameter should be made to have an average particle diameter of from 10 to 30 mμ in order to control the Ra of the magnetic layer to be 0.010 to 0.035 μm.

EXAMPLES 16, 17, COMPARATIVE EXAMPLES 24, 25

Next, the respective tape performances were examined in respect of;
  an example (Example 16) in which a copolymer containing —SO₃K in place of —SO₃Na was used as the vinyl chloride copolymer used in the magnetic layer in Example 1;
  an example (Example 17) in which a resin containing —SO₃Na was used as a polyurethane resin in Example 1;
  an example (Comparative Example 24) in which no carbon black was added in the back coat layer and instead barium sulfate was added in Example 1; and
  an example (Comparative Example 25) in which no back coat layer itself was provided in Example 1.
Results obtained are as shown in Table 6.

TABLE 6

| | Squareness ratio | RF output (dB) | Travel durability | Ra of back coat layer (μm) | Reproducing demagnetization (dB) | Sliding noise (dB) | Head wear (μm) | Dropout (no.) | Adhesion | Transfer |
|---|---|---|---|---|---|---|---|---|---|---|
| Example: | | | | | | | | | | |
| 16 | 0.93 | +1.7 | OK | 0.018 | −0.2 | +0.9 | 1.0 | 1 | A | 0 |
| 17 | 0.94 | +2.5 | OK | 0.018 | −0.3 | +0.8 | 2.0 | 0 | A | 0 |
| Comparative Example: | | | | | | | | | | |
| 24 | 0.94 | +1.3 | OK | 0.025 | −1.5 | +4.0 | 6.0 | 22 | A | 6 |
| 25 | 0.94 | +1.5 | NG* | (0.013: base side) | −0.3 | +3.0 | 4.0 | 7 | A | 1 |

*Edge break occurred at 3 passes.

As will be seen from Table 6, the tapes according to the present invention has superiority.

EXAMPLES 18, 19, COMPARATIVE EXAMPLE 26

Next, compositions with the components as shown below were thoroughly kneaded and dispersed using a kneader and a sand mill. Magnetic coating compositions were thus prepared.

(Upper layer magnetic coating composition A)

| | |
|---|---|
| Co-γ-Fe₂O₃ | 100 parts |
| (Hc: 900 Oe; BET value: 45 m²/g; average major axis: 0.2 μm) | |
| Vinyl chloride copolymer (Exemplary Compound 1) | 10 parts |

$$\begin{array}{cccccc}
H & H & H & H & H & H \\
| & | & | & | & | & | \\
+C-C\!\!\!+_l & +C-C\!\!\!+_m & & +C-C\!\!\!+_n & \\
| & | & | & | & | & | \\
H & Cl & H & SO_3Na & H & C{=}O \\
& & & & & | \\
& & & & & OCH_2CH_2OH
\end{array}$$

l + m + n = approximately 400, l:m:n = 90:4:6

Polyurethane resin                                         7 parts

-continued (containing 
molecular weight: 56,000)

| | |
|---|---|
| α-Al₂O₃ (average particle diameter: 0.2 μm) | 10 parts |
| Stearic acid | 1 part |
| Butyl stearate | 0.5 part |
| Methyl ethyl ketone | 100 parts |
| Cyclohexanone | 120 parts |
| Toluene | 80 parts |
| Mitec AD30 | 3 parts |
| (available from Mitsubishi Chemical Industries Limited) | |
| (Lower layer magnetic coating composition B) | |
| Co-γ-Fe₂O₃ | 100 parts |
| (Hc: 700 Oe; BET value: 28 m²/g; average major axis: 0.25 μm) | |
| Vinyl chloride copolymer (Exemplary Compound 1) | 10 parts |
| (the same as the above) | |
| Polyurethane resin (the same as the above) | 7 parts |
| Stearic acid | 1 part |
| Butyl stearate | 0.5 part |
| Methyl ethyl ketone | 100 parts |
| Cyclohexanone | 120 parts |
| Toluene | 80 parts |
| Mitec AD30 | 3 parts |
| (available from Mitsubishi Chemical Industries Limited) | |

Both the resulting upper layer magnetic coating composition B and upper layer magnetic coating composition A were successively applied to a 13 μm thick polyethylene terephthalate base by means of an extrusion coater, followed by orientation and drying, and thereafter calendering. Here, the upper layer was made to have a dry coating thickness of 0.3 μm, and the lower layer, a dry coating thickness of 2.0 μm.

Thereafter, the sam back coat layer coating composition as used in Example 1 was applied to the opposite surface of the magnetic layers so as to give a dry coating thickness of 0.7 μm.

The magnetic recording medium thus obtained was cut in a width of ½ inches at a line speed of from 700 ml/min to 750 ml/min. A video tape of Example 18 was thus prepared.

Next, tape performances ere measured on the above Example 18, an example (Example 19) in which the above Exemplary Compound 1 was used only in the upper layer, and an example (Comparative Example 26) in which the Exemplary Compound 1 was replaced with the Exemplary Compound 10. Results obtained are shown in Table 7.

As will be seen from the results, the performances can be improved by the application of the present invention also when a magnetic layer is comprised of plural layers.

containing a carbon black on the side opposite to the magnetic layer, wherein said magnetic layer contains a copolymer comprising a unit derived from a vinyl monomer having a sulfonic acid salt group and having a unit derived from a vinyl carboxylic acid ester having a hydroxyl group, said back coat layer having an average surface roughness Ra of from 0.010 to 0.035 μm, and not less than 70% by weight of the carbon black has an average particle diameter of from 10 to 30 mμ.

2. The medium of claim 1, wherein said Ra ranges from 0.012 to 0.032 μm.

3. The medium of claim 1, wherein said Ra ranges from 0.015 to 0.025 μm.

4. The medium of claim 1, wherein 72 to 99% by weight of the carbon black has a mean particle diameter of 10 to 30 mμ.

5. The medium of claim 1, wherein 75 to 90% by weight of the carbon black has a mean particle diameter of 10 to 30 mμ.

6. The medium of claim 1, wherein the carbon black has a mean particle diameter of 12 to 27 mμ.

7. The medium of claim 1, wherein the carbon black has a mean particle diameter of 15 to 25 mμ.

8. The medium of claim 1, wherein said copolymer comprises 0.1 to 50 mol % of a unit derived from vinyl monomer having sulfonic acid salt group and 0.1 to 50 mol % of a unit derived from vinyl carboxylic acid ester having a hydroxyl group.

9. The medium of claim 1, wherein said copolymer comprises 0.5 to 20 mol % of a unit derived from vinyl monomer having sulfonic acid salt group and 0.5 to 20 mol % of a unit derived from vinyl carboxylic acid ester having a hydroxyl group.

10. The medium of claim 1, wherein the molar ratio of a unit derived from vinyl monomer having sulfonic acid salt group to a unit derived from vinyl carboxylic acid ester having a hydroxyl group contained in said copolymer is from 0.1:1 to 10:1.

11. The medium of claim 1, wherein the molar ratio of a unit derived from vinyl monomer having sulfonic acid salt group to a unit derived from vinyl carboxylic acid ester having a hydroxyl group contained in said copolymer is from 0.2:1 to 5:1.

12. The medium of claim 1, wherein said copolymer is represented by the formula;

wherein l+m+n represents 170 to 660, l:m:n=(60 to

TABLE 7

| | Squareness ratio | RF output (dB) | Chroma S/N* (dB) | Travel durability | Ra of back coat layer (μm) | Reproducing demagnetization (dB) | Sliding noise (dB) | Head wear (μm) | Dropout (no.) | Adhesion | Transfer |
|---|---|---|---|---|---|---|---|---|---|---|---|
| Example: | | | | | | | | | | | |
| 18 | 0.90 | 0 | 0 | OK | 0.018 | −0.7 | +1.5 | 3.0 | 2 | A | 0 |
| 19 | 0.88 | +0.1 | +0.2 | OK | 0.018 | −1.0 | +1.2 | 2.5 | 1 | A | 0 |
| Comparative Example: | | | | | | | | | | | |
| 26 | 0.83 | −1.5 | −1.0 | NG** | 0.018 | −2.5 | +4.5 | 8.0 | 3 | B | 0 |

*Chroma S/N (db): Measured using the same deck as in the measurement of RF output (frequency: 629 kHz).
**Travel stopped at 30 passes.

What is claimed is:

1. A magnetic recording medium comprising a support, and provided thereon, a magnetic layer containing a binder and a magnetic powder, and a back coat layer 98):(0.5 to 20):(0.5 to 20), and M represents an alkali metal.

13. The medium of claim 1, wherein a thickness of the magnetic layer is 1.8 to 4.6 mµ.

14. The medium of claim 1, wherein a thickness of the back coat layer is 0.4 to 1.2 mµ.

15. The medium of claim 1 wherein said magnetic powder has a BET value of not less than 40 m²/g.

16. The medium of claim 1 wherein said magnetic layer is comprised of plural layers, and the uppermost layer thereof has a thickness of not more than 0.6 µm.

17. The medium of claim 1 wherein said magnetic layer is comprised of a first magnetic layer and a second magnetic layer on the support in this order, and the first magnetic layer has a thickness of from 1.5 to 4.0 µm.

18. The medium of claim 1 wherein said binder is a copolymer further containing a unit represented by the following formula:

* * * * *